G. SKARIE.
AUTOMOBILE TIRE FASTENING DEVICE.
APPLICATION FILED JAN. 23, 1917.
1,227,330.
Patented May 22, 1917.
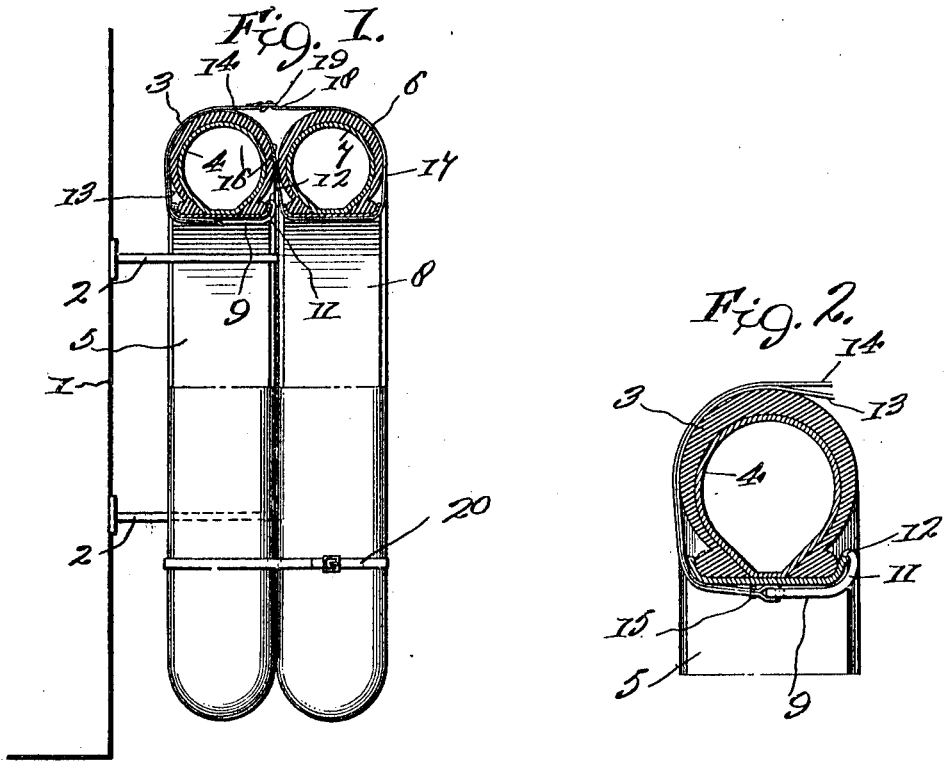
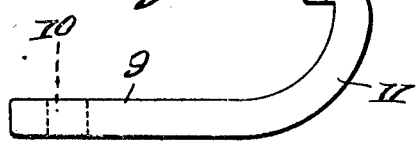
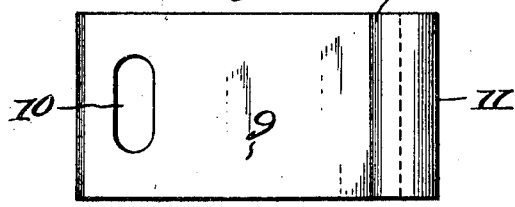
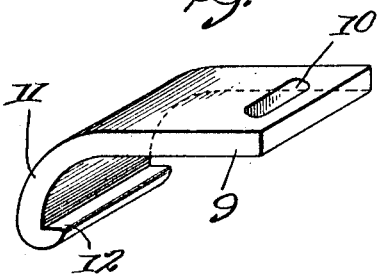
Witnesses
Edwin J Beller
R. J. Mawhinney
Inventor
George Skarie,
by Wilkinson Guista Mackaye
Attorneys.

UNITED STATES PATENT OFFICE.

GEORGE SKARIE, OF ALBERT LEA, MINNESOTA.

AUTOMOBILE-TIRE-FASTENING DEVICE.

1,227,330.  Specification of Letters Patent.  Patented May 22, 1917.

Application filed January 23, 1917. Serial No. 143,964.

*To all whom it may concern:*

Be it known that I, GEORGE SKARIE, a citizen of the United States, residing at Albert Lea, in the county of Freeborn and State of Minnesota, have invented certain new and useful Improvements in Automobile-Tire-Fastening Devices; and I do hereby declare the following to be a full, clear, and exact description of the invention, such as will enable others skilled in the art to which it appertains to make and use the same.

The present invention relates to improvements in automobile tire fastening devices of the character wherein extra tires are carried on the automobile for substitution for the tires on the wheels in case of blow-outs or permanent deflation of the tires from other causes.

It is one object of the present invention to provide an improved device for holding a second and additional extra tire on the vehicle where there is no support provided for that additional tire other than the support for holding the first extra tire.

A further object of the present invention resides in providing a device for the above described purposes which will be cheap in construction and easy to operate, so that the additional tire may be quickly removed in case emergency demands its use.

With these and other objects in view the invention consists in the novel details of construction and combinations of parts more fully hereinafter disclosed and particularly pointed out in the claim.

In the accompanying drawings forming a part of this application, and in which similar reference symbols indicate corresponding parts in the several views:

Figure 1 is a side elevational view, partly in section, of two automobile tires, one of which is supported by the improved device constructed according to my invention.

Fig. 2 is an enlarged sectional view through an extra tire illustrating the application of my improved device thereto.

Fig. 3 is an enlarged edge view of the improved hook.

Fig. 4 is a top plan view of the same; and

Fig. 5 is a perspective view of this hook.

Referring more particularly to the drawings, the line 1 in Fig. 1 is intended to represent the rear end of an automobile or other vehicle, and 2 one or more of the supports usually found on such vehicles at the present time for supporting one or more extra tires. But one extra tire is illustrated in Fig. 1, although it will be evident that the supports 2 may be constructed to receive more than one.

The extra tire carried on the supports 2, is shown in Fig. 1 to consist of the usual outer shoe 3 and inner tube 4, these parts being mounted on a rim 5 of any approved type and which is of the demountable character. In accordance with the usual practice the inner tube 4 is inflated, and in such inflated condition the first extra tire is placed upon the supports 2. If these supports 2 are extended to receive a second extra tire, such tire is inflated in the same manner and fitted over the supports 2 close against this first extra tire that is shown to be composed of the shoe 3 and inner tube 4.

My invention aims to provide a device for carrying a second or third additional extra tire, which the supports 2 do not receive directly but which is carried from the outermost extra tire on said supports. This additional extra tire is shown to be the second tire in Fig. 1, and is composed of the usual shoe 6 and inner tube 7, the same being fitted over a demountable rim 8 and inflated ready for use.

My improved device for carrying this second additional tire 6, 7, consists of a hook and strap, which are clearly indicated in Fig. 1, as is also the method of their attachment. The hook is more particularly shown in Figs. 3, 4 and 5, where it is shown to consist of a straight shank 9, having an opening 10 to receive the strap, and which shank lies within the rim 5 of the first tire 3, 4, which is carried on the supports 2. At one end of the shank 9 there is provided a curved bill 11, conforming substantially to the curvature of the side flange of the tire rim 5 about which it fits, and having an overhanging lip 12. This lip 12 is designed to engage over the rear edge of the rim 5, as most clearly disclosed in Fig. 2. The positioning of the hook will be clear from an inspection of these Figs. 1 and 2.

The strap is passed through the opening 10 in the shank 9 of the hook, and its doubled branches 13 and 14 are preferably secured together adjacent the hook by some fastening means 15. This fastening 15 may be omitted if desired, but its presence maintains the two branches 13 and 14 of the strap in the proper relative positions. From the hook the branches 13 and 14 of the strap are carried forwardly beneath the rim 5 and upwardly and about the casing 3, at the upper portion of which these branches separate, the inside branch 13 passing down between the tire shoes 3 and 6, as indicated at 16, and beneath the rim 8 of the additional extra tire, and from there upwardly and about the shoe 6 as at 17.

The free end of the branch 13 of this strap is, after passing about the shoe 16, directed forwardly and inserted through a buckle 19 attached to the free end of the shorter strap branch 14. The manner of passing this strap about the additional tire, which the supports 2 are not long enough to engage, is obvious from Fig. 1 of the drawings. Of course the branches 13 and 14 of the strap may be varied in relative length, as desired or found necessary, and buckle 19 brought to other positions. However, the position shown in Fig. 1 is probably that most desirable, as the buckle 19 in this figure is illustrated as being directly above the space between the two shoes 3 and 6, where it will give ample room for attachment to the free end 18 of the strap branch 13.

In applying the device the hook is first inserted within the rim 5 of the tire already mounted on the supports 2, with its lip 12 engaging over the rearward edge of said rim. But a single device of the character described is necessary to hold the tire, such device being placed at the top of the tires. The straps, which are preferably permanently carried by the hook, are then wrapped around the two tires in the manner shown in Fig. 1 and above more particularly described, and when the buckle 19 is coupled to the free end 18 the additional tire 6, 7, will be held supported from the other extra tire 3, 4. One or more other straps 20, of usual construction, are passed about the two tires at other points to bind said tires closely together and prevent any loose play of the additional tire.

When its use is desired, the additional tire 6, 7, may be readily dismounted from its support by first releasing the straps 20 and subsequently unfastening the buckle 19, whereupon the additional tire will immediately fall to the ground, disengaging itself from the branch 13 of the strap. This branch 13 will then hang down freely in readiness to receive the tire which is removed from the vehicle wheel.

It is obvious that those skilled in the art may vary the details of construction and arrangements of parts without departing from the spirit of my invention, and therefore I do not wish to be limited to such features except as may be required by the claim.

I claim:

A vehicle tire fastening device of the character described including a hook adapted to engage the rim of a tire support, and a strap having a bight attached to said hook forming two branches adapted to pass together beneath and over the tire support and the tire mounted thereon, and one of said branches being adapted to pass beneath and over a second tire, with means for adjustably connecting the ends of the two branches of said strap, substantially as described.

In testimony whereof, I affix my signature.

GEORGE SKARIE.

Copies of this patent may be obtained for five cents each, by addressing the "Commissioner of Patents, Washington, D. C."